(12) United States Patent
Kim et al.

(10) Patent No.: US 12,131,439 B2
(45) Date of Patent: Oct. 29, 2024

(54) IMAGE PROCESSING APPARATUS AND METHOD

(71) Applicant: Samsung Electronics Co., Ltd., Suwon-si (KR)

(72) Inventors: Jiwhan Kim, Seongnam-si (KR); Sungjoo Suh, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/387,993

(22) Filed: Nov. 8, 2023

(65) Prior Publication Data

US 2024/0078633 A1 Mar. 7, 2024

Related U.S. Application Data

(63) Continuation of application No. 16/910,406, filed on Jun. 24, 2020, now Pat. No. 11,854,159.

(30) Foreign Application Priority Data

Oct. 17, 2019 (KR) .................. 10-2019-0129315

(51) Int. Cl.
*G06T 3/4046* (2024.01)
*G06F 18/214* (2023.01)
(Continued)

(52) U.S. Cl.
CPC .......... *G06T 3/4046* (2013.01); *G06F 18/214* (2023.01); *G06N 3/04* (2013.01);
(Continued)

(58) Field of Classification Search
CPC ... G06T 3/4046; G06T 3/4007; G06T 3/4053; G06T 7/11; G06T 2207/20081;
(Continued)

(56) References Cited

U.S. PATENT DOCUMENTS

| 38,904 A | * | 6/1863 | Lyman | ..................... G01B 3/02 |
| | | | | 33/490 |
| 8,149,914 B2 | | 4/2012 | Shimauchi et al. | |

(Continued)

FOREIGN PATENT DOCUMENTS

| CN | 105869117 A | * | 8/2016 | ............... G06T 1/20 |
| EP | 2204045 B1 | * | 7/2017 | ............. G06T 15/20 |

(Continued)

OTHER PUBLICATIONS

Shi et al., "Real-Time Single Image and Video Super-Resolution Using an Efficient Sub-Pixel Convolutional Neural Network," CVPR paper, pp. 1874-1883.

(Continued)

*Primary Examiner* — Charles T Shedrick
(74) *Attorney, Agent, or Firm* — NSIP Law

(57) ABSTRACT

An image processing method includes extracting a first region in a first image by inputting the first image to a pretrained neural network, upscaling a resolution of the first region by performing neural network-based super resolution processing on the first region, and upscaling a resolution of a second region in the first image from which the first region is excluded by performing interpolation on the second region.

18 Claims, 6 Drawing Sheets

(51) Int. Cl.
  *G06N 3/04* (2023.01)
  *G06N 3/08* (2023.01)
  *G06T 3/4007* (2024.01)
  *G06T 3/4053* (2024.01)
  *G06V 10/764* (2022.01)
  *G06V 10/82* (2022.01)

(52) U.S. Cl.
  CPC .............. *G06N 3/08* (2013.01); *G06T 3/4007* (2013.01); *G06T 3/4053* (2013.01); *G06V 10/764* (2022.01); *G06V 10/82* (2022.01)

(58) Field of Classification Search
  CPC ........ G06T 2207/20084; G06F 18/214; G06N 3/04; G06N 3/08; G06N 3/044; G06N 3/045; G06N 3/088; G06V 10/764; G06V 10/82
  See application file for complete search history.

(56) References Cited

U.S. PATENT DOCUMENTS

| | | | | |
|---|---|---|---|---|
| 9,734,559 | B1* | 8/2017 | Liu | G06T 3/4053 |
| 9,865,037 | B2* | 1/2018 | Salvador Marcos | G06T 3/4007 |
| 10,825,138 | B2* | 11/2020 | Wang | G06T 3/4053 |
| 10,958,869 | B1* | 3/2021 | Chi | H04N 11/02 |
| 2007/0091997 | A1* | 4/2007 | Fogg | H04N 19/102 375/E7.176 |
| 2014/0198977 | A1* | 7/2014 | Narasimha | G06T 5/90 382/154 |
| 2014/0301661 | A1* | 10/2014 | Voronov | G06T 5/50 382/282 |
| 2015/0332120 | A1* | 11/2015 | Litvak | G06V 10/46 382/176 |
| 2016/0180502 | A1* | 6/2016 | Salvador Marcos | G06T 3/4007 382/155 |
| 2017/0231589 | A1* | 8/2017 | Fujii | A61B 6/032 378/20 |
| 2018/0061058 | A1* | 3/2018 | Xu | G06N 3/084 |
| 2018/0075581 | A1* | 3/2018 | Shi | G06N 3/045 |
| 2018/0129893 | A1* | 5/2018 | Son | G06N 3/063 |
| 2019/0005619 | A1* | 1/2019 | Michelini | G06N 3/045 |
| 2019/0057488 | A1* | 2/2019 | Li | G06T 7/136 |
| 2019/0192880 | A1* | 6/2019 | Hibbard | G16H 30/20 |
| 2021/0012459 | A1* | 1/2021 | Chen | G06T 5/50 |
| 2021/0118095 | A1* | 4/2021 | Kim | G06N 3/08 |
| 2021/0201049 | A1* | 7/2021 | Su | G06F 18/2411 |
| 2021/0256658 | A1* | 8/2021 | Kim | H04L 65/61 |
| 2021/0271917 | A1* | 9/2021 | Xu | G06F 18/24 |
| 2021/0287333 | A1* | 9/2021 | Kang | G06T 5/50 |
| 2022/0198612 | A1* | 6/2022 | Weinmann | G06T 3/40 |

FOREIGN PATENT DOCUMENTS

| | | | | |
|---|---|---|---|---|
| KR | 10-2016-0038554 A | | 4/2016 | |
| KR | 10-2016-0063792 A | | 6/2016 | |
| KR | 10-2018-0114488 A | | 10/2018 | |
| KR | 10-2019-0040586 A | | 4/2019 | |
| WO | WO-2016080311 A1 | * | 5/2016 | ............... A61B 6/03 |
| WO | WO 2016/132146 A1 | | 8/2016 | |
| WO | WO 2017/219263 A1 | | 12/2017 | |
| WO | WO 2018/053340 A1 | | 3/2018 | |
| WO | WO-2019054561 A1 | * | 3/2019 | ........... H04N 19/103 |
| WO | WO-2020000333 A1 | * | 1/2020 | ............... G06T 3/40 |

OTHER PUBLICATIONS

Hu et al., "Meta-SR: A Magnification-Arbitrary Network for Super-Resolution," CVPR paper, pp. 1575-1584.
Lim et al., "Enhanced Deep Residual Networks for Single Image Super-Resolution," CVPR workshop paper, pp. 136-144.
Timofte et al., "NTIRE 2018 Challenge on Single Image Super-Resolution: Methods and Result," CVPR workshop paper, pp. 965-976.
Zhang et al., "Image Super-Resolution Using Very Deep Residual Channel Attention Networks," ECCV 2018, 16 pages.
W.-C. Siu and K.-W. Hung, "Review of image interpolation and super-resolution," Proceedings of The 2012 Asia Pacific Signal and Information Processing Association Annual Summit and Conference, 2012, pp. 1-10. (Year: 2012).
Machine Translation of counterpart Korean Patent Application No. 10-2016-0063792 A from espace.net. 2016.
Translation of Counterpart Korean Patent Application KR 10-2014-0106870 A. 2016.

* cited by examiner

IMAGE PROCESSING APPARATUS AND METHOD

CROSS-REFERENCE TO RELATED APPLICATIONS

This application is a continuation of U.S. patent application Ser. No. 16/910,406 filed on Jun. 24, 2020, which claims the benefit under 35 USC § 119(a) of Korean Patent Application No. 10-2019-0129315 filed on Oct. 17, 2019, in the Korean Intellectual Property Office, the entire disclosure of which is incorporated herein by reference for all purposes.

BACKGROUND

1. Field

The following description relates to an image processing apparatus and method, and more particularly, to a super-resolution technology for improving a resolution of an image using a neural network.

2. Description of Related Art

A deep learning-based convolutional neural network (CNN) is used for super-resolution processing for an image. The super-resolution processing may include, when a low-resolution image is input to the CNN, extracting feature data for each patch of the input low-resolution image, and upscaling the low-resolution image to a high-resolution image using the extracted feature data and previously learned data.

For example, a subpixel convolution method may be implemented by a simple matrix operation which is fast in terms of operation speed because it extracts a feature from a low-resolution image, and thus currently most of super-resolution processing methods employ this subpixel convolution method.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an image processing method includes extracting a first region in a first image by inputting the first image to a pretrained neural network, upscaling a resolution of the first region by performing neural network-based super-resolution processing on the first region, and upscaling a resolution of a second region in the first image from which the first region is excluded by performing interpolation on the second region.

The extracting of the first region may include obtaining an error map by inputting the first image to the pretrained neural network and extracting, as the first region, a region having a greatest average error value from the error map.

The extracting of the region having the greatest average error value as the first region may include extracting the region having the greatest average error value by performing average pooling on the error map, and extracting the region having the greatest average error value as the first region.

The pretrained neural network may be trained based on an image corresponding to a difference between the first image and a ground truth image corresponding to the first image.

The extracting of the first region may include extracting the first region by inputting a feature corresponding to the first image to the pretrained neural network.

The first region may correspond to a high-frequency component of the first image.

The upscaling of the resolution of the first region may include inputting the first region to a first convolution layer, inputting an output of the first convolution layer to an interpolation layer, and inputting an output of the interpolation layer to a second convolution layer.

In another general aspect, an image processing system includes a first neural network configured to extract a feature corresponding to a first image, and a second neural network including a plurality of upsampling layers and configured to receive the extracted feature and gradually upscale a resolution of the first image.

Each of the upsampling layers may include an upblock layer configured to upscale a resolution of an input image of a corresponding upsampling layer, and an error prediction layer configured to extract a first region to be included in an input image of a next upsampling layer of the corresponding upsampling layer.

The upblock layer may include a super-resolution processing layer configured to perform neural network-based super-resolution processing on the first region included in the input image of the upsampling layer, and an interpolation processing layer configured to perform interpolation on a second region in the input image of the upsampling layer from which the first region included in the input image of the upsampling layer is excluded. The upblock layer may upscale the resolution of the input image of the upsampling layer based on an output of the super-resolution processing layer and an output of the interpolation processing layer.

The super-resolution processing layer may include a first convolution layer configured to receive the first region included in the input image of the upsampling layer, an interpolation layer configured to receive an output of the first convolution layer, and a second convolution layer configured to receive an output of the interpolation layer.

The first region may have a same size as the first image.

The error prediction layer may generate an error map of the next upsampling layer and extract, as the first region, a region having a greatest average error value from the error map.

Each of the upsampling layers may further include a conversion layer configured to receive an output of the upblock layer and generate the input image of the next upsampling layer.

A scale factor of each of the upsampling layers may be determined based on the number of the upsampling layers and a final scale factor.

In another general aspect, an image processing apparatus includes one or more processors. The one or more processors may extract a first region in a first image by inputting the first image to a pretrained neural network, upscale a resolution of the first region by performing neural network-based super-resolution processing on the first region, and upscale a resolution of a second region in the first image from which the first region is excluded by performing interpolation on the second region.

The processor may obtain an error map by inputting the first image to the pretrained neural network and extract, as the first region, a region having a greatest average error value from the error map.

The processor may extract the region having the greatest average error value by performing average pooling on the error map and extract the region having the greatest average error value as the first region.

The pretrained neural network may be trained based on an image corresponding to a difference between the first image and a ground truth image corresponding to the first image.

In another general aspect, an image processing method includes inputting a first region corresponding to a low-frequency component of a low-resolution image to an interpolation layer of a neural network; inputting a second region corresponding to a high-frequency component of the low-resolution image to a first upsampling layer of the neural network; inputting successive outputs of the first upsampling layer and one or more second upsampling layers of the neural network to the one or more second upsampling layers to generate a final output; and generating a high-resolution image of the low-resolution image by adding an output of the interpolation layer and the final output.

The first upsampling layer and each of the one or more second upsampling layers may be connected in series.

The high-frequency component of the low-resolution image may exclude the low-frequency component of the low-resolution image.

Other features and aspects will be apparent from the following detailed description, the drawings, and the claims.

Figure 1:
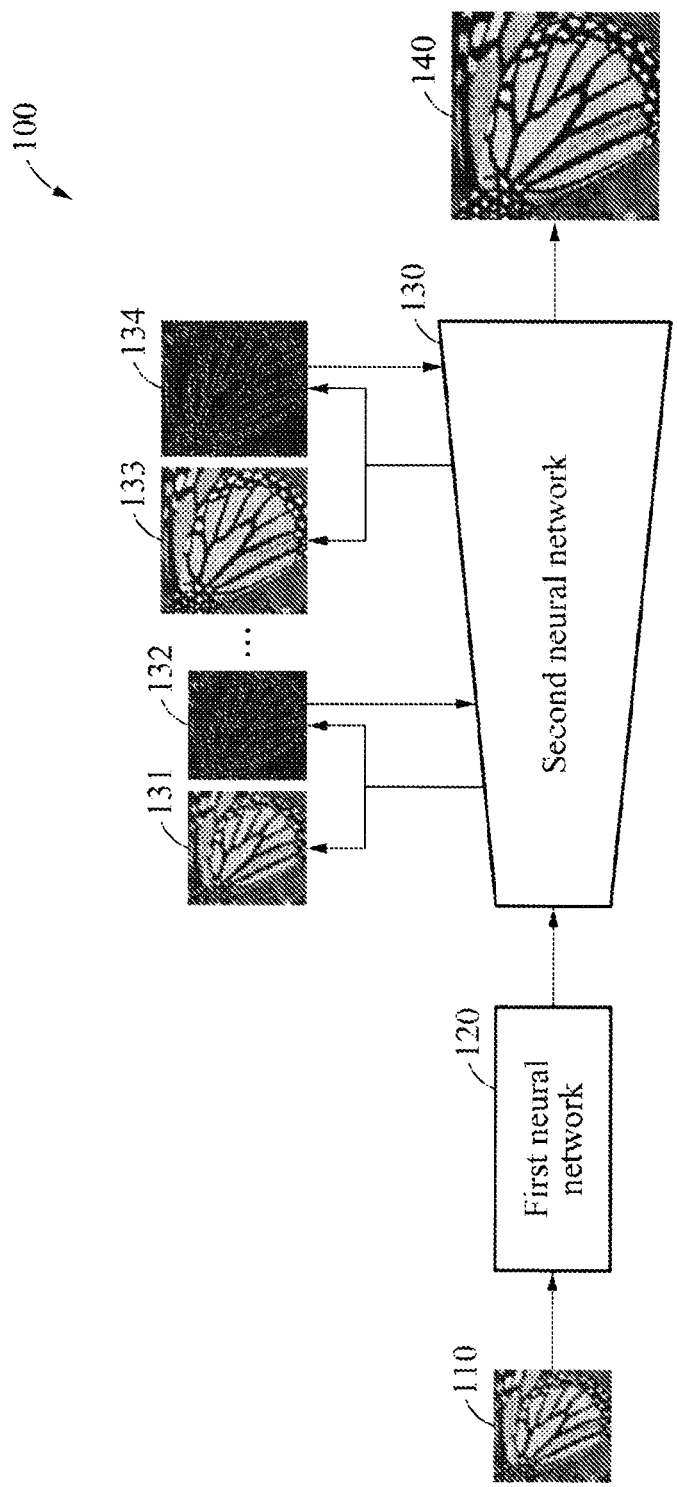
FIG. 1 is a diagram illustrating an example of an operation of an image processing system.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Throughout the specification, when a component is described as being "connected to," or "coupled to" another component, it may be directly "connected to," or "coupled to" the other component, or there may be one or more other components intervening therebetween. In contrast, when an element is described as being "directly connected to," or "directly coupled to" another element, there can be no other elements intervening therebetween. Likewise, similar expressions, for example, "between" and "immediately between," and "adjacent to" and "immediately adjacent to," are also to be construed in the same way. As used herein, the term "and/or" includes any one and any combination of any two or more of the associated listed items.

The terminology used herein is for describing various examples only and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application and are not to be interpreted in an idealized or overly formal sense unless expressly so defined herein.

Also, in the description of example embodiments, detailed description of structures or functions that are thereby known after an understanding of the disclosure of the present application will be omitted when it is deemed that such description will cause ambiguous interpretation of the example embodiments.

The following example embodiments may be embodied in various forms of products, for example, a personal computer (PC), a laptop computer, a tablet PC, a smartphone, a television (TV), a smart home appliance, an intelligent vehicle, a kiosk, and a wearable device. Hereinafter, examples will be described in detail with reference to the accompanying drawings, and like reference numerals in the drawings refer to like elements throughout.

FIG. 1 is a diagram illustrating an example of an operation of an image processing system.

Referring to FIG. 1, an image processing system may refer to a system configured to perform super-resolution processing to upscale a low-resolution image 110 to a high-resolution image 140. Hereinafter, the image processing system will also be referred to as a super-resolution processing system 100.

In an example, the super-resolution processing system 100 may be provided or embedded in a smartphone, for example, and used to improve a zoomed image quality of a camera image. The super-resolution processing system 100 may also be provided or embedded in various image output devices, such as, for example, a medical imaging device and a surveillance camera, to improve an image quality.

As a deep learning technology has evolved further, there has been a growing number of attempts to apply deep learning to an image processing system or a super-resolution processing system. For example, a super-resolution processing system at its initial stage, for example, a super-resolution convolutional neural network (SRCNN) may improve a resolution of an image by applying interpolation to enlarge a size of the image to a desired size and then performing a convolution operation. Such super-resolution processing system at the initial stage may enable a super resolution of a desired scale unrestrictedly. However, it may extract a feature by allowing a high-resolution image to pass through a neural network, and may thus be slow in operation speed and consume a great amount of memory usage.

For another example, a subpixel convolution method may generate a high-resolution image by inputting a low-resolution image to a convolution layer and performing an operation of enlarging a width and a height of feature data. The subpixel convolution method may be implemented by a simple matrix operation and extract a feature from the low-resolution image, and may thus be fast in operation speed. Thus, the subpixel convolution method may be adopted for most of currently used super-resolution processing methods.

However, the subpixel convolution method may enlarge an image only by an integer scale, for example, x2, x3, and x4, and not enlarge an image by a fractional scale, for example, x1.2 and x1.5. In addition, the subpixel convolution method may not enable multiscale enlargement because each scale needs a separate network.

Thus, for a system that needs fractional scale or multiscale image enlargement, for example, a smartphone system that needs to obtain an image of a desired scale unrestrictedly, the current deep learning-based super-resolution processing system may have its limitations in performing super-resolution processing on various scales.

In an example, the super-resolution processing system 100 may perform fractional multiple scale super-resolution processing and multiscale super-resolution processing, in addition to integral multiple scale super-resolution processing, using a gradual super-resolution processing method. As illustrated in FIG. 1, the super-resolution processing system 100 includes a first neural network 120 and a second neural network 130. The super-resolution processing system 100 may upscale a resolution of the low-resolution image 110 to convert it to the high-resolution image 140. For example, the super-resolution processing system 100 may convert the low-resolution image 110 with a resolution of w*h to the high-resolution image 140 with a resolution of sw*sh. The term "upscale or upscaling an image" used herein may indicate upscale or upscaling a resolution of the image.

The first neural network 120 may be a feature extractor configured to extract feature data of the low-resolution image 110. In an example, the feature data may include a feature map. The second neural network 130 may receive the feature data, and gradually upscale a resolution of the low-resolution image 110. Although to be described in detail hereinafter, the second neural network 130 may include a plurality of upsampling layers each being configured to upscale an image input to a corresponding layer and output the upscaled image and then transmit the upscaled image to a next layer.

The super-resolution processing system 100 may connect in series the upsampling layers configured to upscale an input image to gradually upscale the resolution of the low-resolution image 110. The super-resolution processing system 100 may extract an output of one layer among the upsampling layers of the second neural network 130. Through this, the super-resolution processing system 100 may upscale the low-resolution image 110 on a fractional scale and multiscale. For example, the super-resolution processing system 100 may also obtain intermediate images 131, 132, 133, and 134 in addition to the high-resolution image 140, which is a final image.

However, when using the gradual super-resolution processing method, the number of upsampling layers may increase and a resolution of an image to be input may increase, and thus an operation or computational amount may increase. To improve such an issue, the super-resolution processing system 100 may classify the input image into a simple region with a simple texture and a complex region with a complex texture, and perform the upscaling using interpolation on the simple region and perform neural network-based upscaling on the complex region.

For the simple region, there may be few errors in a result image obtained using the interpolation to upscale the simple region. In contrast, for the complex region, there may be many errors in a result image obtained using the interpolation to upscale the complex region. For example, when the simple region such as the sky and cloud is upscaled using the interpolation, a relatively high peak signal-to-noise ratio (PSNR) may be obtained. However, when the complex region such as a complex object is upscaled using the interpolation, an extremely low PSNR may be obtained.

The super-resolution processing system 100 may use the gradual super-resolution processing method to enable the super-resolution processing on a fractional multiple scale and a multiscale in addition to an integral multiple scale. Simultaneously, the super-resolution processing system 100 may extract a region having a great error and perform neural network-based upscaling only on the extracted region, thereby reducing an operation or computational amount while minimizing degradation of performance. Hereinafter, an overall configuration of a super-resolution processing system will be described with reference to FIG. 2, and an operation of an upsampling layer will be described with reference to FIGS. 3 and 4. In addition, a detailed upscaling method will be described with reference to FIG. 5, and a configuration of an image processing apparatus will be described with reference to FIG. 6.

Figure 2:
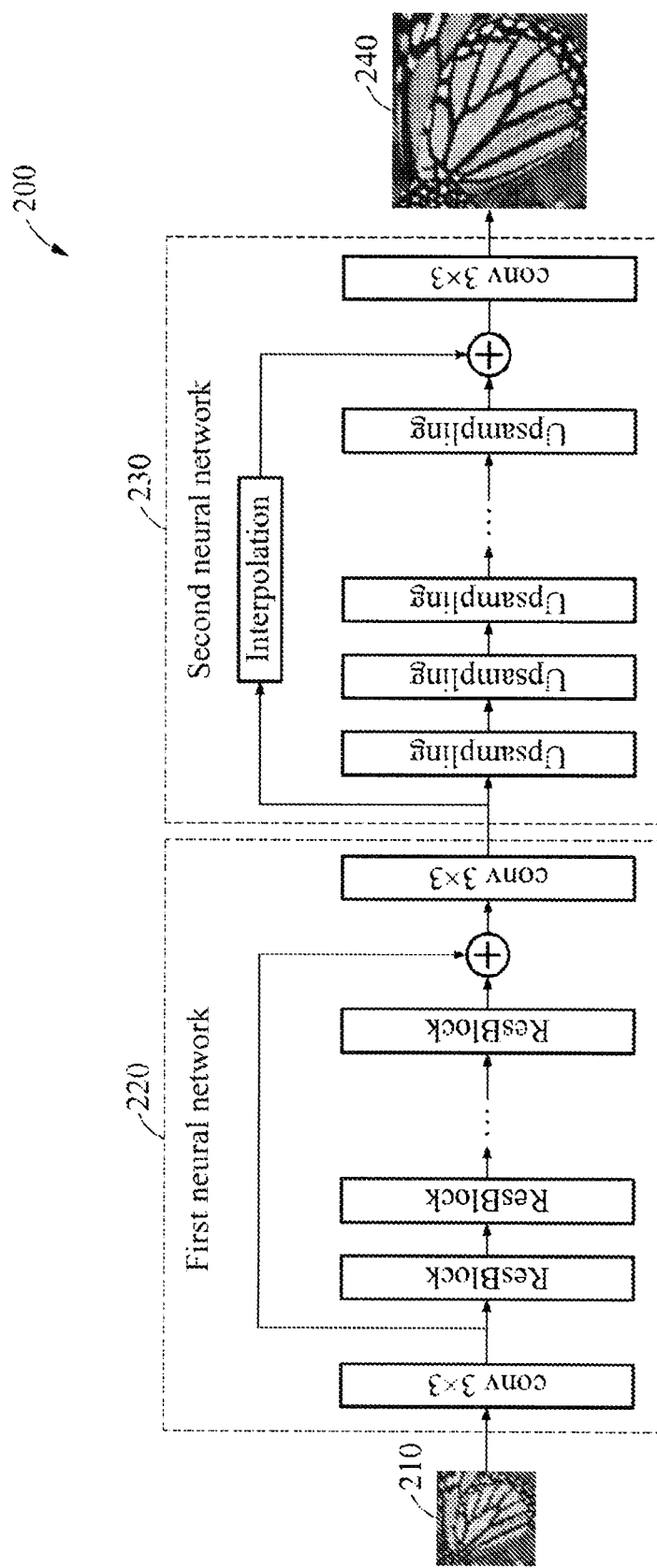
FIG. 2 is a diagram illustrating an example of a super-resolution processing system.

FIG. 2 is a diagram illustrating an example of a super-resolution processing system.

In the example of FIG. 2, a super-resolution processing system 200, a low-resolution image 210, a first neural network 220, a second neural network 230, and a high-resolution image 240 may respectively correspond to the super-resolution processing system 100, the low-resolution image 110, the first neural network 120, the second neural network 130, and the high-resolution image 140 which are described above with respect to FIG. 1. Each of the first neural network 220 and the second neural network 230 may be embodied by one or more hardware modules, one or more software modules, and various combinations thereof.

What has been described above with reference to FIG. 1 may be applicable hereto, and thus a more detailed and repeated description will be omitted here for brevity. In an example, a neural network may include an artificial neural network (ANN), and the ANN may be used for deep learning. The ANN may indicate a whole model including artificial neurons or nodes forming a network through synapses, and have a problem-solving capability. The ANN may be defined by a connection pattern between neurons of different layers, a training process to update a model parameter, and an activation function to generate an output value.

The ANN may include an input layer, an output layer, and selectively at least one hidden layer. Each of the layers may include one or more neurons, and the ANN may include the synapses that connect the neurons. In the ANN, each of the neurons may output a function value of the activation function in response to an input signal to be input through the synapses, and a weight and a bias.

The model parameter used herein may refer to a parameter to be determined through training, and include a weight of a connection through a synapse, a bias of a neuron, and the like. In addition, a hyperparameter may refer to a parameter that needs to be set before the training in a deep learning algorithm, and include a learning rate, an iteration number, a minibatch size, an initialization function, and the like.

The training of the ANN may be to determine a model parameter that minimizes a loss function. The loss function may be used as an indicator to determine an optimal model parameter in a training phase of the ANN.

In the example, the first neural network 220 may be a neural network configured to extract feature data of the low-resolution image 210. The first neural network 220 may include various types of neural networks that extract a feature of an image. For example, the first neural network 220 may include a residual network (ResNet). The ResNet may be a network in which residual blocks (ResBlocks) are connected in series. The ResBlocks may be configured to generate a feature map by performing filtering on frames that are input sequentially from a recurrent neural network (RNN), apply batch normalization to the generated feature map, and apply an activation function to the normalized feature map. The ResNet is provided merely as an example of the first neural network 220, and the first neural network 220 may be embodied by other various neural networks configured to extract a feature of an image.

In the example, the second neural network 230 may be a neural network configured to receive the feature data and gradually upscale a resolution of the low-resolution image 210. The second neural network 230 may also be referred to as an upsampling neural network. The second neural network 230 may be a network in which a plurality of upsampling layers are connected in series.

In this example, based on the number d of the upsampling layers and a final scale factor s indicating a scale desired to be finally obtained, a scale factor s1/d of each of the upsampling layers may be determined. When the super-resolution processing system 200 extracts an image after the image passes through n upsampling layers among the upsampling layers, the super-resolution processing system 200 may obtain an image upscaled by sn/d from the original image. When the image passes through all the upsampling layers, the super-resolution processing system 200 may finally obtain an image upscaled by a factor of s times.

The second neural network 230 further includes an interpolation layer separate from the upsampling layers. The super-resolution processing system 200 may input a region corresponding to a low-frequency component to the interpolation layer of the second neural network 230, and input a region corresponding to a high-frequency component to the upsampling layers of the second neural network 230. The second neural network 230 may generate final data by adding an output of the interpolation layer and a final output of the upsampling layers.

The second neural network 230 further includes a convolution layer configured to convert the final data to the high-resolution image 240. For example, the convolution layer may convert the final data to a form of a color image through three channels, for example, red, green, and blue (RGB) channels, and output a color image.

As described above, the upsampling layers of the second neural network 230 may be connected in series, and thus an image input to a corresponding layer may be upscaled and output, and the upscaled image may be transmitted to a next layer of the corresponding layer. Through this, it is possible to gradually upscale the low-resolution image 210. The upsampling layers may perform neural network-based upscaling only on a region having a relatively great error, and perform upscaling on a region having a relatively small error through a simple interpolation operation. Thus, it is possible to reduce an operation or computational amount while minimizing degradation of performance. A detailed configuration and operation of an upsampling layer will be described hereinafter with reference to FIGS. 3 and 4.

Figure 3:
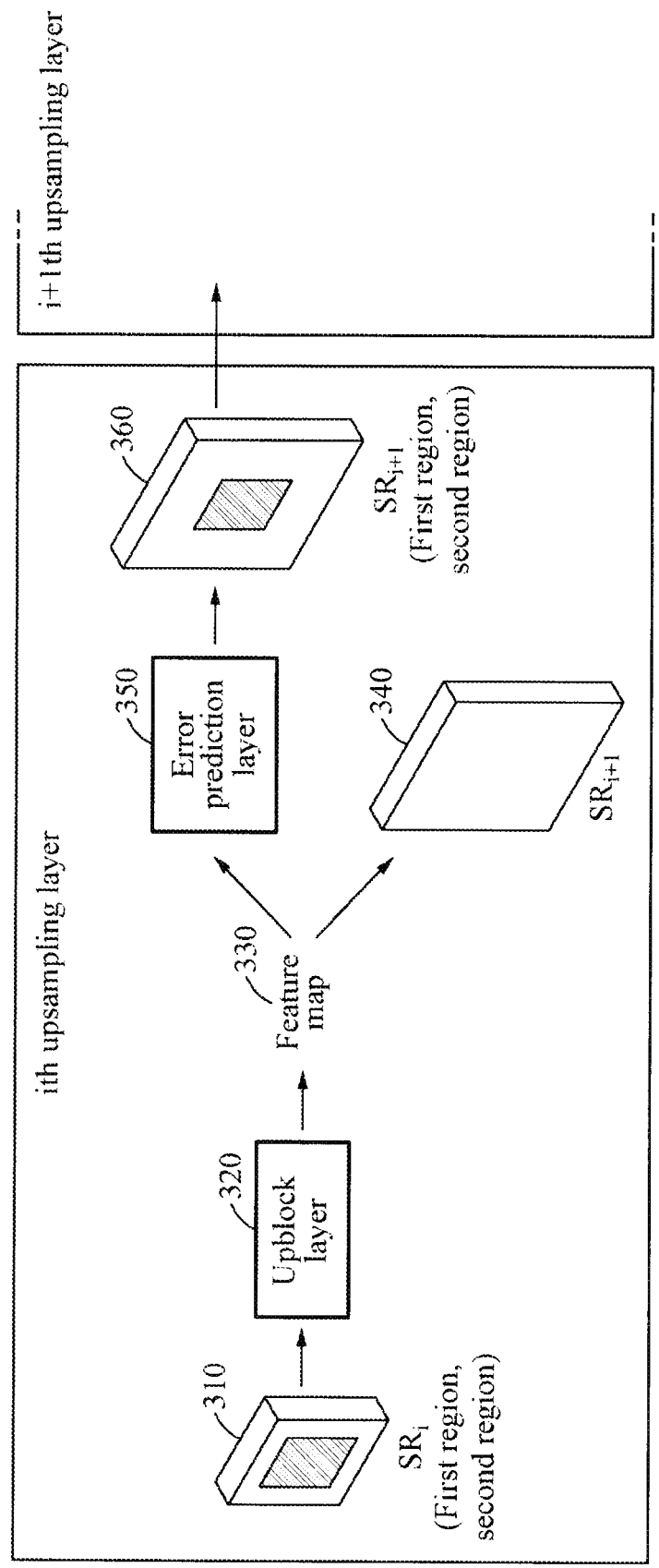
FIG. 3 is a diagram illustrating an example of an upsampling layer.

FIG. 3 is a diagram illustrating an example of an upsampling layer.

A second neural network may include a plurality of upsampling layers that are connected in series. An upsampling layer may include an upblock layer and an error prediction layer. Referring to FIG. 3, an ith upsampling layer includes an upblock layer 320 and an error prediction layer 350, and transmits a final output 360 to an i+1th upsampling layer.

The upblock layer 320 may be a layer configured to upscale a resolution of an input image SRi 310 of the ith upsampling layer. Hereinafter, the input image SRi 310 of the ith upsampling layer will be simply referred to as the input image 310.

The upblock layer 320 outputs a feature map 330. The feature map 330 may include feature data corresponding to the upscaled resolution of the input image 310. A detailed structure and operation of the upblock layer 320 will be described hereinafter with reference to FIG. 4.

The ith upsampling layer inputs the feature map 330 to a convolution layer, and obtains an input image SRi+1 340 of a next upsampling layer, for example, the i+1th upsampling layer. Hereinafter, the input image SRi+1 340 of the i+1th upsampling layer will be simply referred to as the next input image 340.

As described above, the convolution layer outputs the feature map 330 to a form of an image through three RGB channels. The next input image 340 may be an image obtained by upscaling the resolution of the input image 310.

To reduce an operation or computational amount in the i+1th upsampling layer, the ith upsampling layer may extract a region having a relatively great error, which is a complex region with a complex texture, from the next input image 340. Hereinafter, the region having a relatively great error will be referred to as a first region or an error region.

The ith upsampling layer inputs the feature map 330 to the error prediction layer 350 to extract the error region. The error prediction layer 350 may be a layer configured to receive the feature map 330 and extract the error region from the next input image 340. A detailed structure and operation of the error prediction layer 350 will be described hereinafter with reference to FIG. 4.

The error prediction layer 350 generates, as the final output 360, a next input image from which the error region is extracted or excluded. The final output 360 is input to the i+1th upsampling layer. A super-resolution processing system may repeat the operations described above to perform gradual super-resolution processing.

Figure 4:
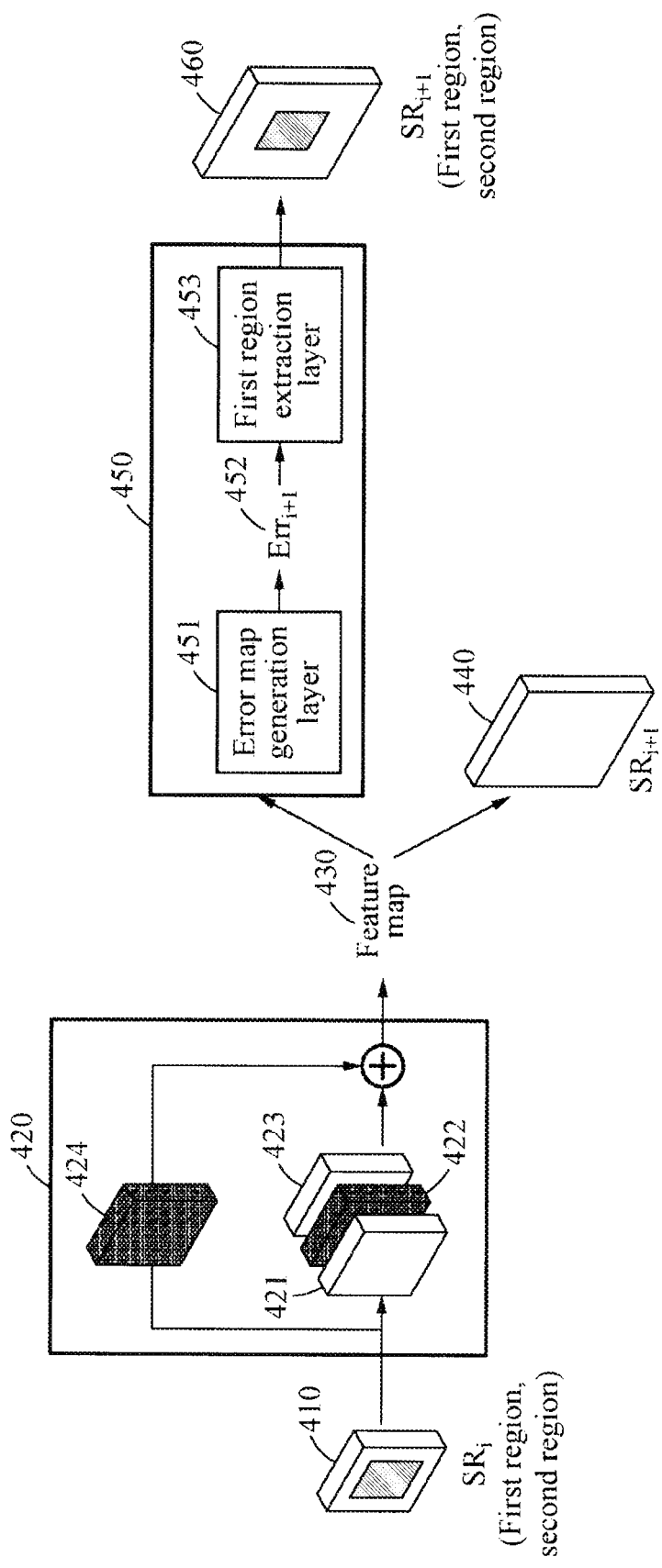
FIG. 4 is a diagram illustrating an example of an upblock layer and an error prediction layer.

FIG. 4 is a diagram illustrating an example of an upblock layer and an error prediction layer.

Referring to FIG. 4, an input image 410 of an upsampling layer, an upblock layer 420 of the upsampling layer, a feature map 430, an input image 440 of a next upsampling layer of the upsampling layer, an error prediction layer 450 of the upsampling layer, and an input image 460 from which an error region is extracted or excluded may respectively correspond to the input image 310, the upblock layer 320, the feature map 330, the next input image 340, the error prediction layer 350, and the final output 360 which are described above with reference to FIG. 3. Thus, what is described above with reference to FIG. 3 may be applicable hereto, and a more detailed and repeated description will be omitted here for brevity.

The upblock layer 420 receives the input image 410. The input image 410 may be an image from which a first region or an error region is extracted or excluded by a previous upsampling layer. A region in the input image 410 from which the first region is excluded may be referred to as a second region, and the second region may be a region having a relatively small error or a simple texture.

The upblock layer 420 includes a super-resolution processing layer and an interpolation processing layer 424. The super-resolution processing layer includes a combination of a convolution layer and an interpolation layer. For example, as illustrated, the super-resolution processing layer is a layer in which a first convolution layer 421, an interpolation layer 422, and a second convolution layer 423 are connected in series.

The super-resolution processing layer performs neural network-based super-resolution processing on the first region of the input image 410, and upscales a resolution of the first region. The interpolation processing layer 424 performs interpolation on the second region and upscales a resolution of the second region. The upblock layer 420 generates the feature map 430 by adding an output of the super-resolution processing layer and an output of the interpolation processing layer 424.

The upsampling layer extracts the next input image 440 and a next error map Erri+1 452 based on the feature map 430. An error map described herein may be an image representing a size of an error. The error may indicate a difference between an input image and a ground truth image which is a target high-resolution image corresponding to the input image. The feature map 430 may be trained or learned to include feature data of the next input image 440 and the next error map Erri+1 452.

The upblock layer 420 may be trained to output an upscaled image based on the ground truth image which is the target high-resolution image. The upblock layer 420 may train or learn parameters of a neural network to minimize a difference between the predicted next input image SR(i+1) 440 and an image IHR(i+1) obtained by downsampling the ground truth image to be suitable for a size of the next upsampling layer. Hereinafter, an image LSR(i+1) corresponding to the difference between the next input image SR(i+1) 440 and the downsampled image IHR(i+1) will be simply referred to as a target image.

The upblock layer 420 may train or learn the parameters of the neural network to minimize a difference LErr(i+1) between the predicted next error map Erri+1 452 and the target image LSR(i+1). In an example, the training of the neural network for the upblock layer 420 may be performed by a separate server device. The server device may use training data provided in advance, or use training data collected from one or more users. Alternatively, the server device may use training data generated by a simulation. A final loss function may be represented by Equation 1.

$$L = L_{SR_N}(I_{LR}) + \lambda \Sigma_{i=0}^{N-1}[L_{SR_i}(I_{LR}) + L_{Err_i}(I_{LR})]$$ [Equation 1]

The error prediction layer 450 includes an error map generation layer 451 and a first region extraction layer 453. The error map generation layer 451 receives the feature map 430 and outputs the next error map Erri+1 452. The first region extraction layer 453 extracts the first region or the error region from the next error map Erri+1 452.

The first region extraction layer 453 performs average pooling on the next error map Erri+1 452 and extracts, as the first region, a region having a greatest average error value. A size of the first region to be extracted may be the same as a size of an initially input low-resolution image. The first region is where the neural network-based super-resolution processing is to be performed in the next upsampling layer, and thus the size of the first region may need to be set to be the same as the initially input low-resolution image in order to prevent an increase in an operation or computational amount to be processed in the neural network.

The error prediction layer 450 outputs the next input image 460 from which the first region is extracted or excluded and transmits the next input image 460 to the next upsampling layer. The next upsampling layer may repeat the operations described above, and thus an upsampling neural network may gradually upscale the low-resolution image.

Figure 5:
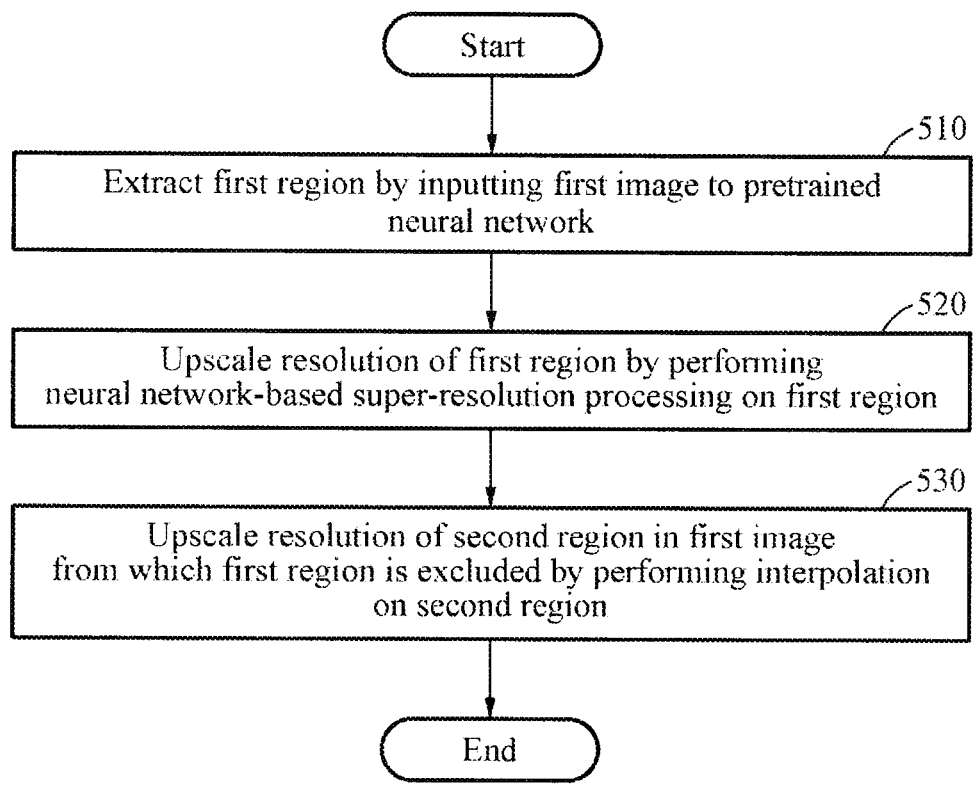
FIG. 5 is a flowchart illustrating an example of an image processing method.

FIG. 5 is a flowchart illustrating an example of an image processing method.

Operation 510 through 530 with reference to FIG. 5 may be performed by an image processing apparatus. The image processing apparatus may be embodied by one or more hardware modules, one or more software modules, or various combinations thereof.

The operations to be described hereinafter may be performed in sequential order as illustrated in FIG. 5. Alternatively, some of the operations may change in order or be omitted without departing from the spirit and scope of the examples described herein. Some of the operations may be performed in parallel or concurrently.

Referring to FIG. 5, in operation 510, the image processing apparatus extracts a first region by inputting a first image to a pretrained neural network. The first image may be an input image described above with reference to FIGS. 2 through 4, and the first region may be an error region described above with reference to FIGS. 2 through 4. The pretrained neural network may be an error prediction layer described above with reference to FIGS. 3 and 4. The image processing apparatus may extract the first region by inputting, to the pretrained neural network, feature data corresponding to the first image. The first region may correspond to a high-frequency component of the first image.

In operation 520, the image processing apparatus upscales a resolution of the first region by performing neural network-based super-resolution processing on the first region. For example, the image processing apparatus may perform precise neural network-based upscaling on a region having a greatest error as a current result.

In operation 530, the image processing apparatus upscales a resolution of a second region of the first image from which the first region is excluded by performing interpolation on the second region. For example, the image processing apparatus may upscale the resolution of the second region having a relatively smaller error without performing neural network-based training and testing, but through a simple interpolation calculation. Through this, the image processing apparatus may reduce an operation or computational amount while minimizing degradation of performance.

Figure 6:
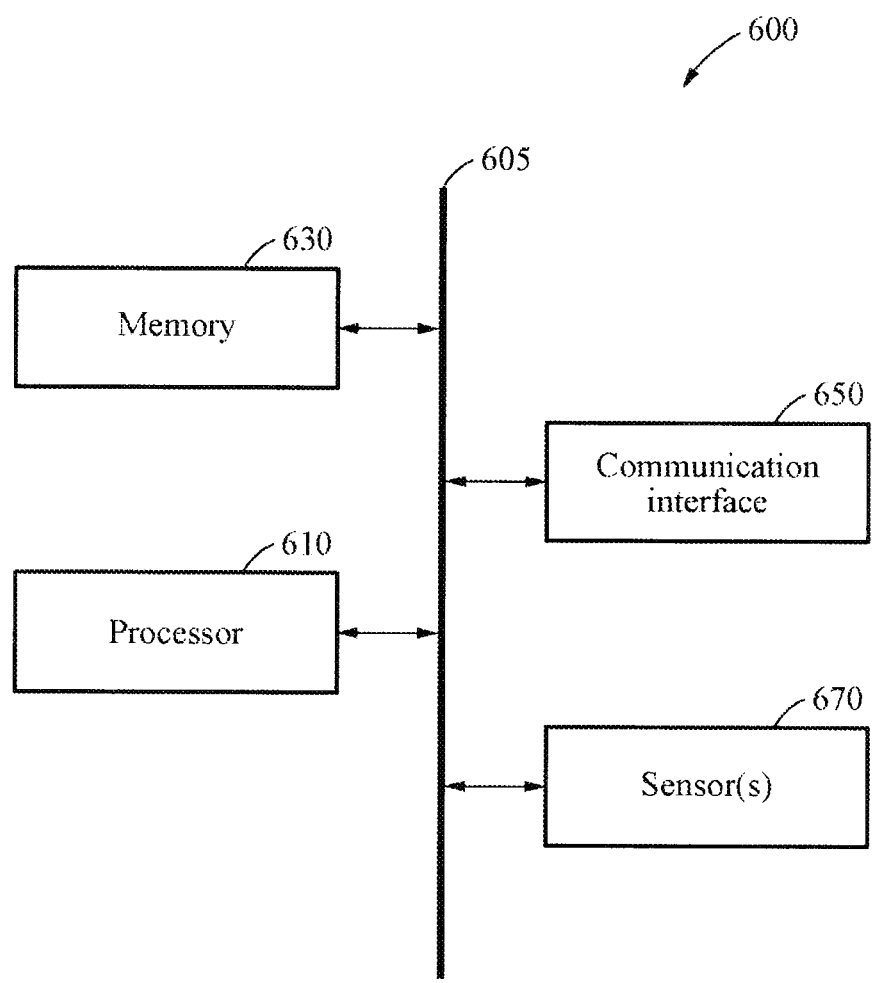
FIG. 6 is a diagram illustrating an example of an image processing apparatus.

FIG. 6 is a diagram illustrating an example of an image processing apparatus.

Referring to FIG. 6, an image processing apparatus 600 includes a processor 610. The image processing apparatus 600 further includes a memory 630, a communication interface 650, and a sensor(s) 670. The processor 610, the memory 630, the communication interface 650, and the sensor 670 may communicate with another through a communication bus 605.

The processor 610 may extract a first region by inputting a first image to a pretrained neural network, upscale a resolution of the first region by performing neural network-based super-resolution processing, and upscale a resolution of a second region of the first image from which the first region is excluded by performing interpolation on the second region.

The memory 630 may store therein an input image and an error map. The memory 630 may be a volatile or nonvolatile memory.

The sensor 670 may include, for example, a camera sensor configured to collect image information. The sensor 670 may collect various sets of image information.

In an example, the processor 610 may input the first image to the pretrained neural network and obtain an error map and extract, as the first region, a region having a greatest average error value from the obtained error map.

In this example, the processor 610 may perform average pooling on the error map and extract the region having the greatest average error value, and extract the extracted region as the first region.

The processor 610 may perform one or more, or all, of the operations or methods described above with reference to FIGS. 1 through 5, or an algorithm corresponding to the one or more, or all, of the operations or methods. The processor 610 may execute a program and control the image processing apparatus 600. A code of the program to be executed by the processor 610 may be stored in the memory 630. The image processing apparatus 600 may be connected to an external device, for example, a PC and a network, through an input and output device (not shown), and exchange data with the external device. The image processing apparatus 600 may be provided or embedded in various computing devices and/or systems, such as, for example, a smartphone, a tablet computer, a laptop computer, a desktop computer, a TV, a wearable device, a security system, a smart home system, and the like.

The image processing system, the super-resolution processing system, the image processing apparatus, and other apparatuses, units, modules, devices, and other components described herein with respect to FIGS. 1 and 6 are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 2-5 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. An image processing method comprising:
    receiving an upscale request;
    extracting a feature corresponding to a first image by inputting the first image into a first neural network;
    inputting the feature into a second neural network including a plurality of upsampling layers to determine the output of a target upsampling layer corresponding to the upscale request; and
    outputting an upscale image corresponding to the output of the target upsampling layer,
    wherein upscale request includes a decimal multiple scale request.

2. The image processing method of claim 1, wherein inputting the feature into a second neural network comprises:
    extracting a first region to be included in an input image of a next upsampling layer of the corresponding upsampling layer by inputting the first image into the error prediction layer.

3. The image processing method of claim 2, wherein inputting the feature into a second neural network comprises:
    performing neural network-based super-resolution processing on the first region included in the input image of the upsampling layer;
    performing interpolation on a second region in the input image of the upsampling layer from which the first region included in the input image of the upsampling layer is excluded; and
    upscaling the resolution of the input image of the upsampling layer based on an output of the neural network-based super-resolution processing and an output of the interpolation.

4. The image processing method of claim 3, wherein the super-resolution processing layer includes:
    a first convolution layer configured to receive the first region included in the input image of the upsampling layer;
    an interpolation layer configured to receive an output of the first convolution layer; and
    a second convolution layer configured to receive an output of the interpolation layer.

5. The image processing method of claim 2, wherein the error prediction layer is configured to generate an error map of the next upsampling layer and extract, as the first region, a region having a greatest average error value from the error map.

6. The image processing method of claim 1, wherein each of the upsampling layers further includes:
    a conversion layer configured to receive an output of the upblock layer and generate the input image of the next upsampling layer.

7. The image processing method of claim 1, wherein a scale factor of each of the upsampling layers is respectively determined based on a number of the upsampling layers and a final scale factor.

8. The image processing method of claim 2, wherein the next first region has a same size as the first image.

9. A non-transitory computer-readable storage medium storing instructions that, when executed by a processor, cause the processor to perform the image processing method of claim 1.

10. An image processing apparatus comprising:
    one or more processors configured to:
    receive an upscale request;
    extract a feature corresponding to a first image by inputting the first image into a first neural network;
    input the feature into a second neural network including a plurality of upsampling layers to determine the output of a target upsampling layer corresponding to the upscale request; and output an upscale image corresponding to the output of the target upsampling layer, wherein upscale request includes a decimal multiple scale request.

11. The image processing apparatus of claim 10, wherein the processor is configured to:

extract a first region to be included in an input image of a next upsampling layer of the corresponding upsampling layer by inputting the first image into the error prediction layer.

12. The image processing apparatus of claim 11, wherein the processor is configured to:

perform neural network-based super-resolution processing on the first region included in the input image of the upsampling layer;

perform interpolation on a second region in the input image of the upsampling layer from which the first region included in the input image of the upsampling layer is excluded; and upscale the resolution of the input image of the upsampling layer based on an output of the neural network-based super-resolution processing and an output of the interpolation.

13. The image processing apparatus of claim 12, wherein the super-resolution processing layer includes:

a first convolution layer configured to receive the first region included in the input image of the upsampling layer;

an interpolation layer configured to receive an output of the first convolution layer; and a second convolution layer configured to receive an output of the interpolation layer.

14. The image processing apparatus of claim 11, wherein the error prediction layer is configured to generate an error map of the next upsampling layer and extract, as the first region, a region having a greatest average error value from the error map.

15. The image processing apparatus of claim 10, wherein each of the upsampling layers further includes:

a conversion layer configured to receive an output of the upblock layer and generate the input image of the next upsampling layer.

16. The image processing apparatus of claim 10, wherein a scale factor of each of the upsampling layers is respectively determined based on a number of the upsampling layers and a final scale factor.

17. The image processing apparatus of claim 11, wherein the next first region has a same size as the first image.

18. An image processing method comprising:

dividing the input image into a plurality of blocks;

classifying the plurality of blocks according to texture by inputting the plurality of blocks to a pretrained neural network;

determining an upscaling method for each of the plurality of blocks based on the classification result, and upscaling the plurality of blocks according to the determined upscaling method, wherein the upscale method includes at least one of performing neural network-based super resolution processing and performing interpolation.

* * * * *